Figure 6:
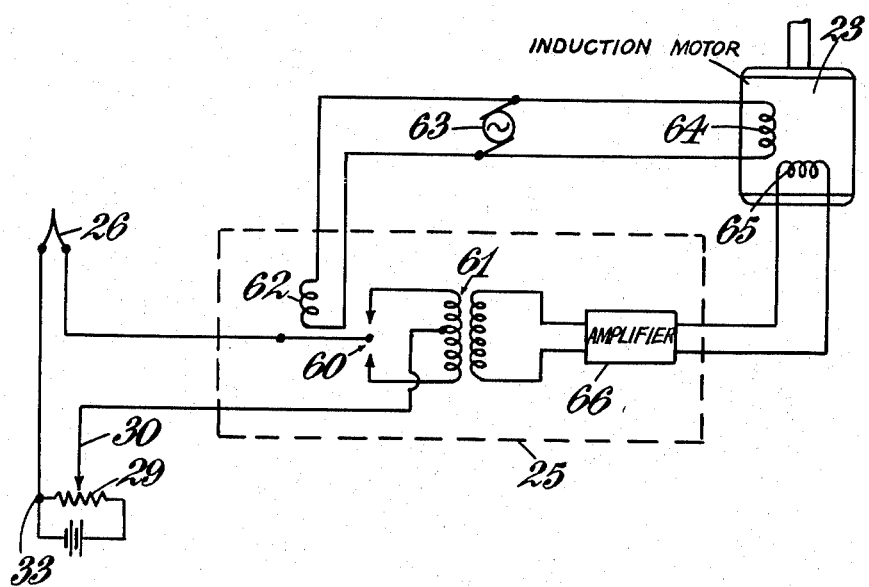

March 3, 1953     R. R. JAMISON ET AL     2,629,984
AUTOMATIC CONTROL FOR INTERNAL-COMBUSTION GAS TURBINES
Filed Feb. 4, 1947     3 Sheets-Sheet 1
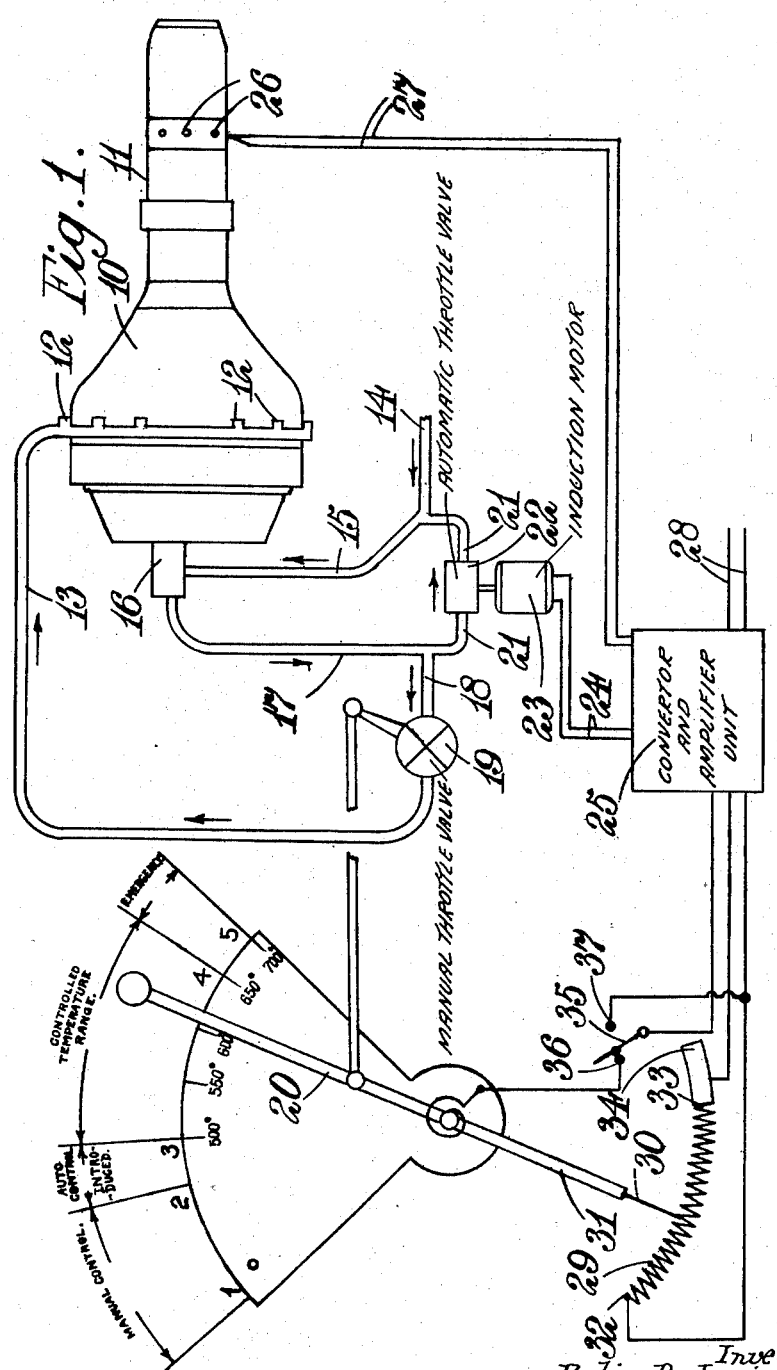
Inventors
Robin R. Jamison and Douglas Reynolds
by Wilkinson & Mawhinney
Attorneys

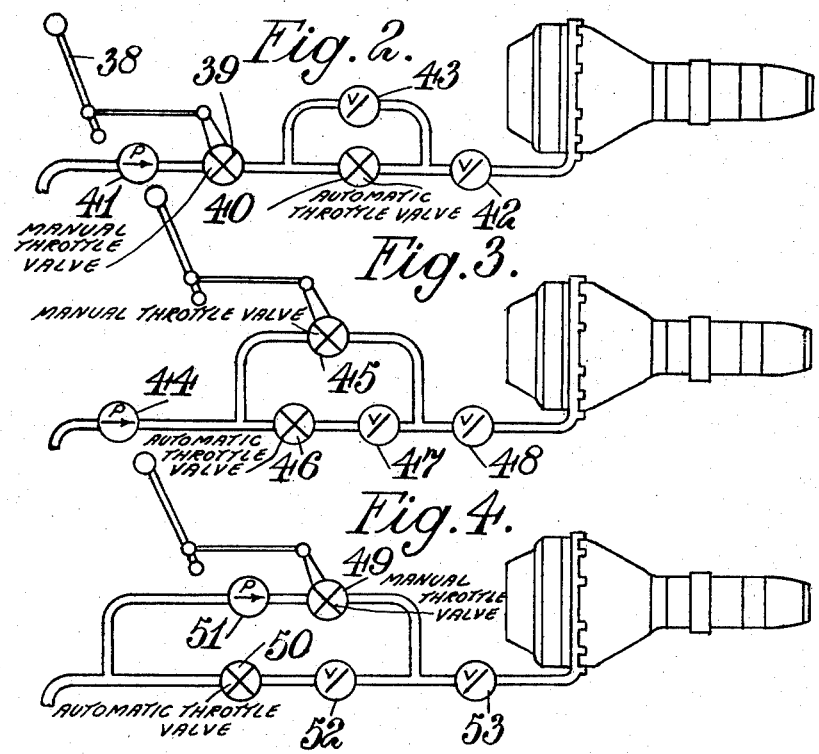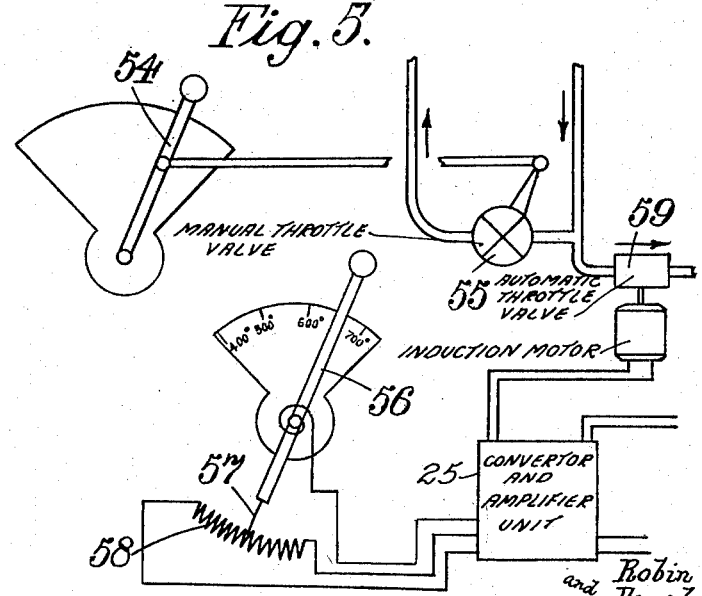

Patented Mar. 3, 1953

2,629,984

UNITED STATES PATENT OFFICE 2,629,984

AUTOMATIC CONTROL FOR INTERNAL-COMBUSTION GAS TURBINES

Robin Ralph Jamison and Douglas Reynolds, Chellaston, England, assignors to Rolls-Royce Limited, Derby, England, a British company Application February 4, 1947, Serial No. 726,280
In Great Britain July 10, 1945

Section 1, Public Law 690, August 8, 1946
Patent expires July 10, 1965

6 Claims. (Cl. 60—39.28)

This invention concerns improvements in or relating to automatic controls for internal-combustion or gas turbines.

It is desirable that automatic controls for gas turbines be capable of ensuring that the turbine operates at its optimum performance with respect to power and efficiency under all conditions and that the turbine is protected from damage due either to excess temperatures or stresses. The first consideration referred to is particularly important when the turbine forms the power unit of an aircraft since in such a case the operating conditions rapidly change with variations in altitude, aircraft forward speed, ambient temperature and other agencies. It is desirable that the automatic controls respond quickly to the altered conditions and produce a control effect having a high degree of accuracy. The present invention has for its object to provide automatic controls for an internal-combustion or gas turbine having these characteristics.

According to the present invention a method of automatically controlling an internal combustion or gas turbine so as to maintain a datum value of one or more of the operating variables of the turbine is characterised in that departure of a variable from its datum value permits or causes an electrical signal to be transmitted to an electronic amplifier, the output of which is applied to means for adjusting the turbine to re-establish said datum.

Although the invention is generally concerned with regulating a gas turbine so as to maintain a datum value of one or more of the variables such as speed, pressure of the working fluid, pressure ratio of the working fluid across a component or at two parts of the turbine, temperature, temperature difference across a component or at two parts of the turbine or any recognised combination of said variables, it is nevertheless more particularly concerned with maintaining a datum value of the temperature variable as hereinafter described.

According to the present invention, there is provided apparatus for controlling an internal combustion turbine having combustion equipment connected to supply heated working fluid to the turbine and an exhaust pipe connected to receive exhaust gases from the turbine, which apparatus comprises a fuel supply pipe leading to said combustion equipment, a first valve connected to said supply pipe and adjustable to select a datum value for the fuel supply flow in said fuel supply pipe, a second valve to vary the fuel supply flow from said datum value, and control means for automatically operating said second valve comprising a temperature-responsive element of the type having an electrical property which varies with the temperature to which the temperature-responsive element responds, which temperature-responsive element is located in said exhaust pipe whereby said electrical property of the temperature-responsive element is varied with changes in temperature of the exhaust gases, adjustable electrical circuit means connected to said temperature responsive element and arranged to be electrically balanced for a selected value of the said electrical property and to give an output for other values of said electrical property, an amplifier circuit to receive the output from said electrical circuit means, a motor connected to the amplifier circuit to be actuated by the amplifier output to adjust the second valve when said electrical circuit means is unbalanced, and manual means arranged to adjust said first valve to select the datum value of fuel supply flow and also arranged to adjust the said electrical circuit to select the value of the variable electrical property at which the adjustable electrical circuit means is balanced.

The temperature-responsive element may be a thermocouple in which case the generated electro-motive force therefrom is preferably applied to a potentiometer bridge net-work where said electro-motive force is balanced against a standard electro-motive force, whilst the datum temperature value is maintained. Alternatively the temperature-responsive element may be a resistance-thermometer which constitutes one arm of a resistance-bridge-network that remains in a state of balance (i. e. there is no current output therefrom) whilst the datum temperature value is maintained.

In the accompanying drawings which illustrate in a purely diagrammatic manner, certain constructions in accordance with the present invention, Figure 1 illustrates the application of the invention to a jet-engine for an aircraft, to control the temperature of the gases passing through the turbine and jet, Figures 2, 3 and 4 illustrate various arrangements of control valves for the fuel supplied to the jet-engine, Figure 5 shows an alternative form of the pilot's control devices in an aircraft, and Figure 6 is an electrical diagram illustrating the connections of parts shown in Figures 1 and 5.

It is a general characteristic of internal-combustion turbines that a high temperature of the working fluid results in a high specific power output and a high thermal efficiency. However, the rapid reduction in the strength of the materials from which the various units of the gas-turbine are constructed, with increase in the temperature of the working fluid, places a practical limit to the maximum temperatures which may be used. Moreover, in order to obtain a gas-turbine of small dimensions and light weight, it is common to resort to high rotational speeds for such components as the turbine-rotors. The speeds referred to will result in the rotor and its associated blades being subjected to high stresses due to centrifugal force and it is therefore necessary to provide means whereby an accurate control of the temperature of the working fluid is attainable in order to ensure safe working of the gas-turbine and optimum performance thereof.

Referring now to Figure 1, the jet-engine is indicated diagrammatically at 10 with the jet pipe at 11 and fuel-injection devices at 12, these being supplied through a fuel-pipe-line 13.

The fuel-supply is drawn from the usual storage tank by a pipe 14 and passes by the pipe 15 to a pump 16 driven by the engine, thence by the pipes 17 and 18 to a manually controlled valve 19 and to the pipe 13. The valve 19 is controlled from a pilot's throttle-lever 20.

A by-pass pipe 21 is provided from the pipe 18 to the pipe 14 and a valve 22 controls the flow of fuel in this pipe from the outlet of the pump 16 back to the inlet side, thereby regulating the amount of fuel which passes by the pipe 18 and valve 19 to the engine. The valve 22 is controlled by an electric motor 23 supplied with current by the lines 24 from an electronic amplifier indicated diagrammatically by 25.

At a convenient point in the exhaust pipe 11 from the turbine, there is provided a thermocouple, or a number of thermo-couples 26 which may be connected in series or in parallel, and which are subjected to the temperature of the exhaust pipe, or of the gases therein; the electromotive force generated in the thermo-couples is transmitted by the wires 27 to a converting and electronic amplifying device 25 of any known or convenient kind to effect the automatic control. For this purpose the electro-motive force generated by the thermo-couple is applied to a potentiometer 29 and balanced against a standard electro-motive force supplied from a battery. In one arrangement (Figure 6), any out-of-balance voltage from the potentiometer is applied to a vibrating two-way switch 60 which supplies alternate and opposite half-cycles to the dual input of a transformer 61. The output of the transformer 61 is amplified in amplifier 66 to the necessary extent and applied to one winding 65 of an induction motor 23. The other winding 64 of the motor is connected to an alternating current supply comprising wires 28 and alternator 63, which supply is also fed to the operating coil 62 of the vibrator switch 60. The vibrator switch 60 is magnetically polarized so that the phase relationship of its output with respect to the alternating current supply is dependent upon the thermo-couple voltage being above or below that determined by the setting of the movable potentiometer contact 30 along the potentiometer 29. This phase relationship determines the direction of rotation of the motor 23.

In this particular form of the invention the movable contact 30 of the potentiometer resistance 29 is carried on an extension 31 of the control-lever 20 which operates the manual fuel-valve 19.

The range of movement of the control lever 20, 31, covers four operating conditions, namely from 1 to 2, "manual control" only; between 2 to 3, the automatic control is brought in, from 3 to 4 is the normal working range, in which the temperature is controlled, and from 4 to 5 is the emergency maximum power range, which is used only on special occasions. In order to prevent accidental movement of the lever beyond the point 4, a gate is preferably provided at this point.

In the first or idling range, the manual valve 19 will be open to only a comparatively small extent, to give a small flow of fuel and no automatic control is needed, this is effected by setting the control, as hereinafter described, to a datum temperature substantially in excess of any temperature that will arise during this range. The automatic valve is thereby rendered inoperative and the control remains solely with the manually operated valve 19.

At any convenient point in the range from 2 to 3, the automatic control is introduced, and the datum temperature selected is the lowest, say 500° C., which is used in normal operation.

Over the range from 3 to 4, the temperature is allowed to rise, giving increasing power-output up to, say, 650° C., and in the emergency range a further rise of temperature up to, say, 700° C., is permitted.

The variation of the datum temperature is effected by movement of the contact 30 over the resistance 29.

When the lever 20 is moved backwards from the maximum power position at the point 5, the contact 31 is moved from the point 32 on the resistance 29 until the point 3 is reached by the lever 20. At this point, the contact 30 reaches the point 33 on the resistance and has traversed the full range of the potentiometer resistance 29; on further movement of the lever 20, from point 3 to the point 2, the contact 30 engages and sweeps over an extended contact block 34 so as to maintain the circuit until the point 2, or some position between 3 and 2 is reached. It is thereby ensured that above the selected position between points 2 and 3, the maximum temperature permitted is 500° C. Still further movement of the lever 20 from the point 2 to the point 1 causes the lever 31 to engage a switch 35 operating between contacts 36 and 37 so as to move it and thereby connect the contact 30 to the end 32 of the resistance 29. The datum temperature thereby selected is the same as when the contact 30 was at the point 32, namely 700° C. Since this temperature is not attained with a small flow of fuel as controlled by the manual valve 19, the automatic control is inoperative.

In the operation of this device, assuming that the engine is being started from rest, the lever 20 is set to a suitable position within the range 1 to 2, and the supply of fuel is controlled solely by the manual valve 19, the by-pass valve 22 being closed by the operation of the motor 23. As the lever 20 is moved forward, when, or shortly after, it reaches the point 2, the switch 35 is released so that it engages the contact 36 and the potentiometer resistance 29 is introduced into circuit with the contact 30 at the end 33 thereof. If the jet pipe temperature is above 500° C. the motor 23 is thereby energised and immediately adjusts the by-pass valve 22 to an open position so as to divert part of the flow of fuel from the pump 16 back to the inlet side of the pump, and thereby reduce the temperature to 500° C.

It is thereby ensured that when the lever 20 reaches the point 3, although the manual valve 19 is open sufficiently to pass excess fuel, the by-pass valve 22, being open, prevents such excess flow and maintains the temperature at a point not exceeding 500° C.

Further forward movement of the lever 20 opens the manual valve 19 so that it will permit an increased flow, but this movement of the lever 20 from the point 3 to the point 4 gradually moves the contact 30 over the resistance 29 thereby adjusting the datum temperature, so that the motor 23 is energised so as gradually to close the valve 22 and thereby allow more fuel to pass to the engine, so that the temperature rises and increased power is obtained, and this continues for movement of the lever 20 up to the point 4 and beyond it through the emergency range also.

It will be seen therefore that the only operation required by the pilot is to set the lever 20 at any position, giving the required output from the engine, and the automatic valve 22 is thereby adjusted so as to give a fuel-flow which will cause the temperature in the exhaust pipe 11 to retain the value indicated by the lever 20. If the operating conditions of the aircraft change so that there is a change in the temperature of the exhaust pipe 11, the electro-motive force generated by the thermo-couple 26 is no longer balanced in accordance with the setting of the resistance 29 and therefore causes current to pass from the amplifier to the motor 23 to adjust the valve 22 in the appropriate direction until the desired temperature conditions are re-established.

In the arrangement shown in Figure 1, the by-pass valve 22 is arranged to effect its control by by-passing fuel back to the inlet side of the pump 16, but various other arrangements of manual and automatic valves can be used. Thus, for example, in the arrangement illustrated in Figure 2, the pilot's control-lever 38 controls the manual valve 39, and the auxiliary valve 40 is placed in series with the valve 39. The fuel pump is indicated at 41 and a turbine shut-off valve at 42, this latter being manually operated between a fully open and a fully closed position when it is desired to shut off the engine. A similar manually operated valve 43 is arranged to by-pass the automatic valve 40, but this valve 43 is kept normally closed and is opened only in the event of failure of the automatic control mechanism. Since the valve 40 is in series with the valve 39, it is arranged to be fully open when the manual valve 39 is in the idling position, and automatically closed to the necessary extent to limit the fuel-flow, and therefore the temperature, at some point in the range from 2 to 3 of the pilot's lever. From the point 3 in the opening movement of the pilot's lever, the valve 40 is automatically controlled to permit the desired flow, irrespective of the amount of opening of the valve 39.

In the arrangement shown in Figure 3 the pump 44 supplies fuel to the manual valve 45 and automatic valve 46, which are arranged in parallel with one another, the shut-off or emergency valves 47, 48 being arranged as shown. In this case the automatic valve 46 is closed over the throttle range from 1 to 2, and is opened within the controlled-temperature-range, so as to pass sufficient additional fuel to allow the desired temperature to be attained, the manually controlled valve 45 passing less fuel than is required for this purpose. In this case the switch 35, 36, 37 is not required.

In the arrangement shown in Figure 4, the manual control valve is indicated at 49 and the automatic control valve at 50, this being arranged to by-pass a pre-determined flow of fuel to the inlet side of the pump 51, similar to the arrangement shown in Figure 1. The emergency and close-down valves are shown at 52 and 53 respectively.

It is not essential that the selection of the operating temperature and the operation of the manual valve should be effected by the same control-lever, and Figure 5 illustrates an arrangement in which two separate controls are provided. The lever 54 operates the manual control-valve 55 and a separate lever 56 operates the contact-member 57 of the potentiometer 58 to effect control of the automatic valve 59. These valves 55 and 59 may be arranged as shown, resembling the arrangement of Figure 1, or as in Figures 2 to 4.

In the arrangement shown in Figure 1, the temperature-responsive device in the exhaust-pipe is constituted by a thermo-couple, the electro-motive force generated by which is applied to a potentiometer and balanced against a standard electro-motive force, but in an alternative arrangement a resistance-thermometer is provided which is exposed to the temperature of the working fluid, the resistance-thermometer forming one arm of a resistance-bridge the output points of which are connected to a suitable electronic amplifying apparatus. The latter is associated with a valve-adjusting motor as described above. Direct or alternating current is applied to the input points of the bridge network, the alternating current supply being preferred from the point of view of simplicity especially if an alternator which is driven by the turbine or independently has been provided for other purposes and can be also used to supply the bridge network.

The provision of a resistance-bridge network as described has the advantage that the apparatus is not affected by variations in the standard electro-motive force of a battery due to temperature variations, as when the power-unit is used in an aircraft. It has the further advantage that by the elimination of the thermo-couple there is no necessity to compensate for the varying temperatures to which the cold junction is exposed.

The application of electronic controls to gas turbine engines in accordance with the present invention provides two main functions:

(a) To ensure that the engine is giving optimum performance with respect to power and efficiency under all conditions, (b) To protect the engine-components from damage due to over heating or over stressing.

The requirements under function (a) are particularly important in the case of gas-turbine units having two or more independent rotors. The use of electronic circuits provides a control having a quick and certain response with a high degree of accuracy, and in the case of temperature-control, the accurate control which is possible with electronic devices prevents damage from overheating due to accidental causes such as obstruction of the air-intake by icing. Since the control ensures that the pre-determined temperatures will not be exceeded in service even under abnormal conditions, engines may be designed with a much closer margin of temperature, and this provides increased power over the operating life. Also it is ensured that when operating at a pre-selected temperature, the power will always be the maximum allowable under the prevailing conditions.

We claim:

1. Apparatus for controlling an internal combustion turbine which includes combustion equipment connected to supply heated working fluid to the turbine and an exhaust pipe connected to receive exhaust gases from the turbine, which apparatus comprises a fuel supply pipe leading to said combustion equipment, a first valve connected to said supply pipe and adjustable to select a datum value for the fuel supply flow in said fuel supply pipe, a second valve to vary the fuel supply flow from said datum value, and control means for automatically operating said second valve comprising a temperature-responsive element of the type having an electrical property which varies with the temperature to which the temperature-responsive element responds, which temperature-responsive element is located in said exhaust pipe whereby said electrical property of the temperature-responsive element is varied with changes in temperature of the exhaust gases, adjustable electrical circuit means connected to said temperature-responsive element and arranged to be electrically balanced for a selected value of the said electrical property and to give an output for other values of said electrical property, an amplifier circuit to receive the output from said electrical circuit means, a motor connected to the amplifier circuit to be actuated by the amplifier output to adjust the second valve when said electrical circuit means is unbalanced, and manual means arranged to adjust said first valve to select the datum value of fuel supply flow and also arranged to adjust the said electrical circuit to select the value of the variable electrical property at which the adjustable electrical circuit means is balanced.

2. Apparatus for controlling an internal combustion turbine which includes combustion equipment connected to supply heated working fluid to the turbine and an exhaust pipe connected to receive exhaust gases from the turbine, which apparatus comprises a fuel supply pipe leading to said combustion equipment, a first valve connected to said supply pipe and adjustable to select a datum value for the fuel supply flow in said fuel supply pipe, a second valve to vary the fuel supply flow from said datum value, and control means for automatically operating said second valve comprising a temperature-responsive element of the type whereof an electrical property varies with the temperature to which the temperature-responsive element responds, which temperature-responsive element is located in the exhaust pipe whereby said electrical property of the temperature-responsive element is varied with changes in temperature of the exhaust gases in said exhaust pipe, adjustable electrical circuit means connected to said temperature-responsive element and arranged to be electrically balanced for a selected value of the said electrical property and to give an output for other values of said electrical property, an amplifier circuit connected to receive and amplify the output from said electrical circuit means, a motor connected to the amplifier circuit to be actuated by the amplifier output to adjust the second valve when said electrical circuit means is unbalanced, and a single manual control lever connected to said first valve to adjust it to select the datum value of the fuel supply flow and operative to simultaneously adjust the electrical circuit means to select the value of the said variable electrical property at which the electrical circuit means is balanced.

3. Apparatus as claimed in claim 2, comprising also a fuel pump connected in said fuel supply pipe, and a bleed pipe connected at its ends to said fuel supply pipe on each side of said fuel pump, and having said second valve connected in said bleed pipe thereby to determine a bleed flow from said fuel supply pipe and to vary the quantity of fuel flowing through said supply pipe to the combustion equipment.

4. Apparatus as claimed in claim 2, comprising a fuel pump connected in said fuel supply pipe and having said first and second valves located in series in the fuel supply pipe downstream of the fuel pump and the said second valve located between said first valve and the combustion equipment.

5. Apparatus as claimed in claim 2, comprising a fuel pump connected in said supply pipe, having said fuel supply pipe formed with parallel connected portions downstream of the pump and having said valves connected respectively in said parallel portions of the fuel supply pipe.

6. Apparatus as claimed in claim 2, wherein the operative connection between said manual control lever and said electrical circuit means is such that for small datum values of the fuel supply flow set by said first valve, said electrical circuit means is inoperative and said second valve is closed.

ROBIN RALPH JAMISON.
DOUGLAS REYNOLDS.

REFERENCES CITED

The following references are of record in the file of this patent:

UNITED STATES PATENTS

| Number | Name | Date |
|---|---|---|
| 2,109,222 | Ryder | Feb. 22, 1938 |
| 2,336,232 | Doran | Dec. 7, 1943 |
| 2,404,428 | Bradbury | July 23, 1946 |
| 2,478,909 | Flagle | Aug. 16, 1949 |